(12) United States Patent
Han et al.

(10) Patent No.: US 10,770,232 B2
(45) Date of Patent: Sep. 8, 2020

(54) MULTILAYER ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Seung Hun Han, Suwon-si (KR); Sung Min Cho, Suwon-si (KR); Dong Joon Oh, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/044,898

(22) Filed: Jul. 25, 2018

(65) Prior Publication Data

US 2019/0103224 A1  Apr. 4, 2019

(30) Foreign Application Priority Data

Sep. 29, 2017 (KR) .......... 10-2017-0128093
Jan. 5, 2018 (KR) .......... 10-2018-0001877

(51) Int. Cl.
*H01G 4/30* (2006.01)
*H01G 4/005* (2006.01)
(Continued)

(52) U.S. Cl.
CPC .............. *H01G 4/30* (2013.01); *H01G 4/005* (2013.01); *H01G 4/12* (2013.01); *H01G 4/224* (2013.01);
(Continued)

(58) Field of Classification Search
CPC ........ H01G 4/008; H01G 4/005; H01G 4/228; H01G 4/30; H01G 4/12; H01G 4/248; H01G 4/1227; H01G 4/012; H01F 5/00
See application file for complete search history.

(56) References Cited

U.S. PATENT DOCUMENTS 5,339,068 A  8/1994 Tsunoda et al.
2010/0290172 A1* 11/2010 Motoki .................. H01G 4/232
361/305

(Continued)

FOREIGN PATENT DOCUMENTS

CN  1129841 A  8/1996
CN  102315017 A  1/2012
(Continued)

OTHER PUBLICATIONS

Office Action dated Apr. 20, 2020 in Chinese Patent Application No. 201811122613.7 (with English Translation).

*Primary Examiner* — Nguyen T Ha
(74) *Attorney, Agent, or Firm* — Morgan, Lewis & Bockius LLP (57) ABSTRACT

A multilayer electronic component for enhancing damp proof reliability includes: a capacitor body including a plurality of dielectric layers, and first and second internal electrodes, alternately disposed across the dielectric layers to expose one end of the first and second electrodes through third and fourth surfaces of the capacitor body; first and second conductive layers disposed on the third and fourth surfaces of the capacitor body and connected to the first and second internal electrodes, respectively; first and second plating layers covering surfaces of the first and second conductive layers; and a plurality of coating layers configured in a multilayer structure on a surface of the capacitor body to expose the first and second plating layers and having an entire thickness of 10 nm to 200 nm.

10 Claims, 7 Drawing Sheets

(51) Int. Cl.
*H01G 4/224* (2006.01)
*H01G 4/232* (2006.01)
*H01G 4/12* (2006.01)

(52) U.S. Cl.
CPC .......... *H01G 4/232* (2013.01); *H01G 4/2325* (2013.01); *H01G 4/1209* (2013.01)

(56) References Cited

U.S. PATENT DOCUMENTS

| | | | | |
|---|---|---|---|---|
| 2011/0193448 A1* | 8/2011 | Saruban | ................ | H01G 4/005 |
| | | | | 310/311 |
| 2011/0309718 A1* | 12/2011 | Ogawa | .................... | H01C 1/14 |
| | | | | 310/311 |
| 2014/0085767 A1* | 3/2014 | Kang | ...................... | H01G 4/12 |
| | | | | 361/301.4 |
| 2015/0287532 A1* | 10/2015 | Abe | .................... | H05K 3/3436 |
| | | | | 174/260 |
| 2015/0340155 A1* | 11/2015 | Fukunaga | .............. | H01G 4/012 |
| | | | | 361/301.4 |
| 2015/0380161 A1 | 12/2015 | Lim et al. | | |

FOREIGN PATENT DOCUMENTS

| | | |
|---|---|---|
| EP | 0708457 A1 | 4/1996 |
| KR | 10-2016-0001026 A | 1/2016 |
| KR | 10-1703195 B1 | 2/2017 |

\* cited by examiner

MULTILAYER ELECTRONIC COMPONENT AND METHOD OF MANUFACTURING THE SAME

CROSS-REFERENCE TO RELATED APPLICATION(S)

This application claims the benefit of priority to Korean Patent Application Nos. 10-2017-0128093 filed on Sep. 29, 2017 and 10-2018-0001877 filed on Jan. 5, 2018 in the Korean Intellectual Property Office, each disclosure of which is incorporated herein by reference in its entirety.

TECHNICAL FIELD

The present disclosure relates to a multilayer electronic component and a method of manufacturing the same.

BACKGROUND

A multilayer capacitor (multilayer ceramic capacitor (MLCC)) a multilayer electronic component, has been reduced in size and, in this regard, an effective volume ratio of a dielectric substance in the same dimension has been increased and an electrode has been relatively reduced in thickness to achieve a high capacity with small dimensions.

Recently, a multilayer capacitor requires damp proof reliability with enhanced specifications, but there is an increasing problem in terms of damp proof reliability due to the penetration of a plating solution or water along with a reduced electrode thickness.

SUMMARY

An aspect of the present disclosure may provide a multilayer electronic component for enhancing damp proof reliability.

According to an exemplary embodiment in the present disclosure, a multilayer electronic component may include a capacitor body including first and second surfaces facing each other, third and fourth surfaces connected to the first and second surfaces and facing each other, and fifth and sixth surfaces connected to the first and second surfaces, connected to the third and fourth surfaces, and facing each other, and including a plurality of dielectric layers, and first and second internal electrodes, alternately disposed across the dielectric layers to expose one end of the first and second electrodes through the third and fourth surfaces, a first conductive layer and a second conductive layer disposed on the third and fourth surfaces of the capacitor body and connected to the first and second internal electrodes, respectively, a first plating layer and a second plating layer covering surfaces of the first and second conductive layers, and a plurality of coating layers configured in a multilayer structure on a surface of the capacitor body to expose the first and second plating layers and having an entire thickness of 10 nm to 200 nm.

At least some of the plurality of coating layers may be formed of different materials.

The plurality of coating layers may be configured with a double-layered structure, and an internal coating layer of the plurality of coating layers includes aluminum oxide ($Al_2O_3$) and an external coating layer of the plurality of coating layers includes any one of silicon dioxide ($SiO_2$) or titanium dioxide ($TiO_2$).

The plurality of coating layers may be formed in island form.

The plurality of coating layers may be further disposed on a portion between the first conductive layer and the first plating layer and a portion between the second conductive layer and the second plating layer.

The first and second plating layers may include a nickel plating layer disposed on the first and second conductive layers and a tin plating layer disposed on the nickel plating layer.

According to another exemplary embodiment in the present disclosure, a method of manufacturing a multilayer electronic component may include forming and sintering first and second conductive layers on opposite ends of a capacitor body to prepare a sintered body, forming a multilayer coating layer by coating and drying a thin film on a circumference of the sintered body using an atomic layer deposition (ALD) process, removing a coating layer formed on surfaces of the first and second conductive layers, and forming first and second plating layers on surfaces of the first and second conductive layers, respectively using a plating process, wherein the multilayered coating layer has an entire thickness of 10 nm to 200 nm.

In the forming of the multilayered coating layer, each layers included in the multilayered coating layer may be formed of different materials.

The forming of the multilayered coating layer may include forming the multilayered coating layer in a double-layered structure, and an internal coating layer of the multilayered coating layer may include aluminum oxide ($Al_2O_3$) and an external coating layer may include any one of silicon dioxide ($SiO_2$) or titanium dioxide ($TiO_2$).

The forming of the multilayer coating layer may include forming the coating layer in island form.

A portion of the coating layer may remain on the surfaces of the first and second conductive layers.

The forming of the first and second plating layers may include forming a nickel plating layer on the first and second conductive layers, respectively and forming a tin plating layer on the nickel plating layer.

According to still another exemplary embodiment in the present disclosure, a multilayer electronic component may include a capacitor body including first and second surfaces facing each other, third and fourth surfaces connected to the first and second surfaces and facing each other, and fifth and sixth surfaces connected to the first and second surfaces, connected to the third and fourth surfaces, and facing each other, and including a plurality of dielectric layers, and first and second internal electrodes, alternately disposed across the dielectric layers to expose one end of the first and second electrodes through the third and fourth surfaces, a first conductive layer and a second conductive layer disposed on the third and fourth surfaces of the capacitor body and connected to the first and second internal electrodes, respectively, a first plating layer and a second plating layer covering surfaces of the first and second conductive layers, and a plurality of coating layers configured in a multilayer structure on a surface of the capacitor body to expose the first and second plating layers. At least some of the plurality of coating layers may be formed of different materials.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
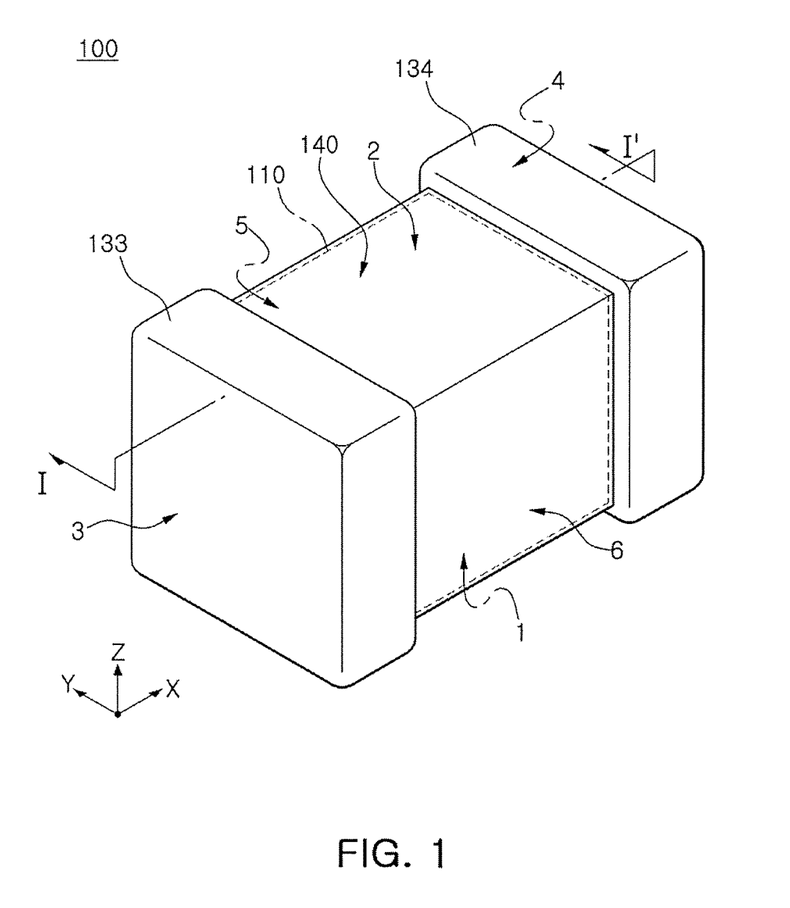
FIG. 1 is a perspective view of a multilayer electronic component according to a first embodiment of the present disclosure.
Figure 2:
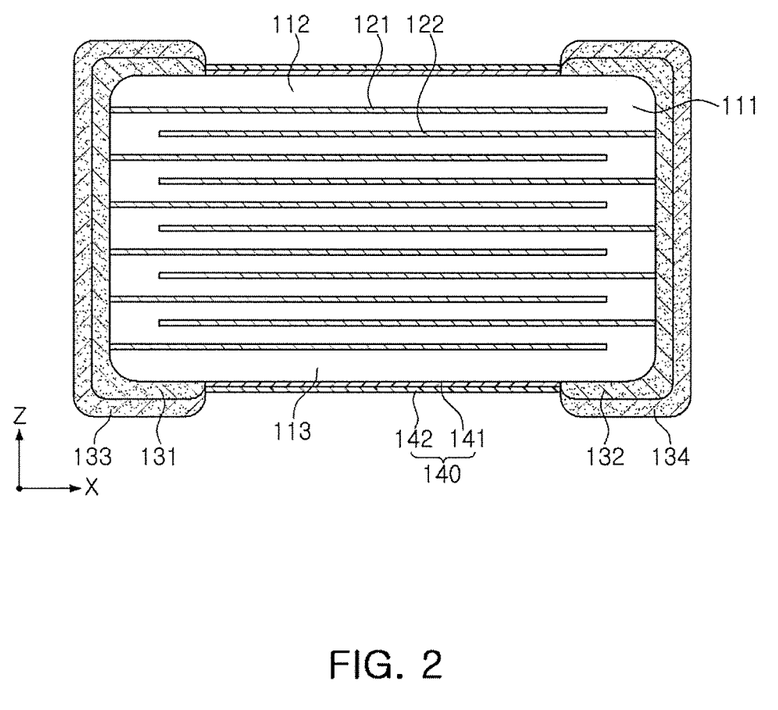
FIG. 2 is a cross-sectional view of FIG. 1 taken along line I-I' of FIG. 1.
Figure 3:
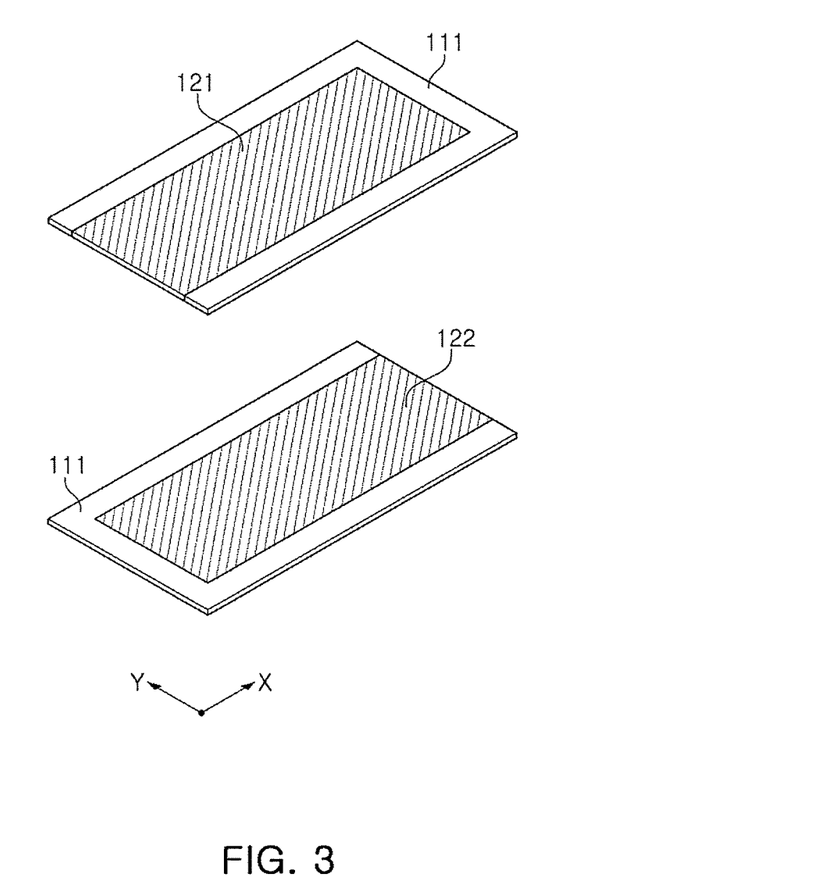
FIG. 3 is an exploded perspective view of a structure of first and second internal electrodes of a capacitor body of FIG. 1.

FIG. 1 is a perspective view of a multilayer electronic component according to a first embodiment of the present disclosure. FIG. 2 is a cross-sectional view of FIG. 1 taken along line I-I' of FIG. 1. FIG. 3 is an exploded perspective view of a structure of first and second internal electrodes of a capacitor body of FIG. 1.

Referring to FIGS. 1 to 3, the multilayer electronic component according to the first embodiment of the present disclosure may include a capacitor body 110, first and second conductive layers 131 and 132, a coating layer 140, and first and second plating layers 133 and 134.

The capacitor body 110 may include a plurality of dielectric layers 111 and a plurality of first and second internal electrodes 121 and 122 that are alternately disposed across the plurality of dielectric layers 111. The plurality of dielectric layers 111 may include a top layer 112 and a bottom layer 113 respectively disposed on an uppermost layer and a bottommost layer of the plurality of first and second internal electrodes 121 and 122.

The capacitor body 110 may include first and second surfaces 1 and 2 that face each other in the Z-axis direction, third and fourth surfaces 3 and 4 that are connected to the first and second surfaces 1 and 2 and face each other in the X-axis direction, and fifth and sixth surfaces 5 and 6 that are connected to the first and second surfaces 1 and 2, are connected to the third and fourth surfaces 3 and 4, and face each other in the Y-axis direction.

One end of the first and second internal electrodes 121 and 122 may be exposed through third and fourth surfaces 3 and 4 of the capacitor body 110, respectively.

The first and second conductive layers 131 and 132 may be disposed on the third and fourth surfaces 3 and 4 of the capacitor body 110, respectively, and may contact and may be electrically connected to the exposed portions of the first and second internal electrodes 121 and 122.

In this case, the first and second conductive layers 131 and 132 may extend to a portion of the first and second surfaces 1 and 2 of the capacitor body 110 and a portion of the fifth and sixth surfaces 5 and 6, respectively.

The first and second plating layers 133 and 134 may be formed to cover surfaces of the first and second conductive layers 131 and 132, respectively.

In this case, the first and second plating layers 133 and 134 may include a nickel (Ni) plating layer formed on the first and second conductive layers 131 and 132 and a tin (Sn) plating layer formed on the Ni plating layer.

The coating layer 140 may be formed on a portion of surface of the capacitor body 110, which is not covered by the first and second plating layers 133 and 134, to externally expose the first and second plating layers 133 and 134.

In this case, the coating layer 140 may be configured in a multilayer structure. According to the present embodiment, the coating layer 140 is configured with a double-layered structure of first and second coating layers 141 and 142 but the present disclosure is not limited thereto and, for example, the coating layer 140 may be configured as a structure having three layers or more.

In this case, the first and second coating layers 141 and 142 may be formed of different materials. For example, the first coating layer 141 positioned on an internal side may include aluminum oxide ($Al_2O_3$) and the second coating layer 142 positioned at an external side may include silicon dioxide ($SiO_2$) or the first coating layer 141 may include $Al_2O_3$ and the second coating layer 142 may include titanium dioxide ($TiO_2$).

$Al_2O_3$, $SiO_2$, and $TiO_2$ are materials that are easily used in vapor deposition and $Al_2O_3$ has property with excellent adhesion to a capacitor body. Therefore, when the internal coating layer 141 is formed of a material including $Al_2O_3$ and the external coating layer 142 is formed of a material including $SiO_2$ or $TiO_2$, water permeability may be further lowered, thereby further enhancing damp proof reliability.

An entire thickness of the coating layer 140 including the first and second coating layers 141 and 142 may be 10 nm to 200 nm. When the entire thickness of the coating layer 140 is less than 10 nm, an effect of enhancing damp proof reliability may be degraded and, when the entire thickness of the coating layer 140 is greater than 200 nm, unnecessary process time may be increased and plating failure may be increased.

Table 1 below shows a change in damp proof yield and plating yield depending on an entire thickness of a coating layer in Comparative Example in which a single $Al_2O_3$ layer is used as a coating layer and an embodiment of the present disclosure in which a double-layered layer of $Al_2O_3$ and $SiO_2$ as a coating layer. Here, a damp proof yield refers to % of the number of samples with no failure of reliability as a result of a test of 100 samples. In addition, the reliability test was performed by applying 9.5 V for 12 hours under a condition of 85° C. and 85%. A plating yield refers to % of the number of samples with no failure of back flash after plating or non-plating failure.

TABLE 1

| | Embodiment ($Al_2O_3$/$SiO_2$) | | | | Comparative Example ($Al_2O_3$) | | |
| --- | --- | --- | --- | --- | --- | --- | --- |
| # | Thickness (nm) | Damp proof yield (%) | Plating yield (%) | # | Thickness (nm) | damp proof yield (%) | Plating yield (%) |
| 1 | 3 | 31% | 97% | 14 | 3 | 33% | 95% |
| 2 | 5 | 45% | 99% | 15 | 5 | 35% | 97% |
| 3 | 8 | 58% | 100% | 16 | 8 | 32% | 100% |
| 4 | 10 | 100% | 100% | 17 | 11 | 49% | 100% |
| 5 | 13 | 100% | 100% | 18 | 14 | 51% | 100% |

TABLE 1-continued

| | Embodiment ($Al_2O_3/SiO_2$) | | | Comparative Example ($Al_2O_3$) | | |
|---|---|---|---|---|---|---|
| # | Thickness (nm) | Damp proof yield (%) | Plating yield (%) | # | Thickness (nm) | damp proof yield (%) | Plating yield (%) |
| 6 | 18 | 100% | 100% | 19 | 19 | 64% | 100% |
| 7 | 25 | 100% | 100% | 20 | 27 | 74% | 100% |
| 8 | 44 | 100% | 100% | 21 | 43 | 97% | 100% |
| 9 | 60 | 100% | 100% | 22 | 61 | 98% | 100% |
| 10 | 86 | 100% | 100% | 23 | 87 | 98% | 100% |
| 11 | 127 | 100% | 100% | 24 | 131 | 98% | 100% |
| 12 | 171 | 100% | 100% | 25 | 170 | 99% | 100% |
| 13 | 211 | 100% | 77% | 26 | 218 | 100% | 78% |

As shown in Table 1 above, according to an embodiment, in Samples 4 to 13 in which a coating layer has a thickness of 10 nm or more, the damp proof yield is 100%, and in Samples 1 to 3 in which a coating layer has a thickness less than 10 nm, the damp proof yield is equal to or less than 60% and, accordingly, it may be seen that there is a problem in terms of damp proof reliability.

It may be seen that, in Sample 13 in which a coating layer has a thickness greater than 200 nm, a plating yield has failure of 77%.

Accordingly, according to the present disclosure, the thickness of the coating layer may be in the range of 10 nm to 200 nm.

It may be seen that, in Comparative Example, Samples 14 to 25 in which a coating layer has a thickness less than 218 nm have failure in damp proof reliability and, Sample 26 in which a coating layer has a thickness of 218 nm has appropriate damp proof reliability but has plating failure.

Figure 6:
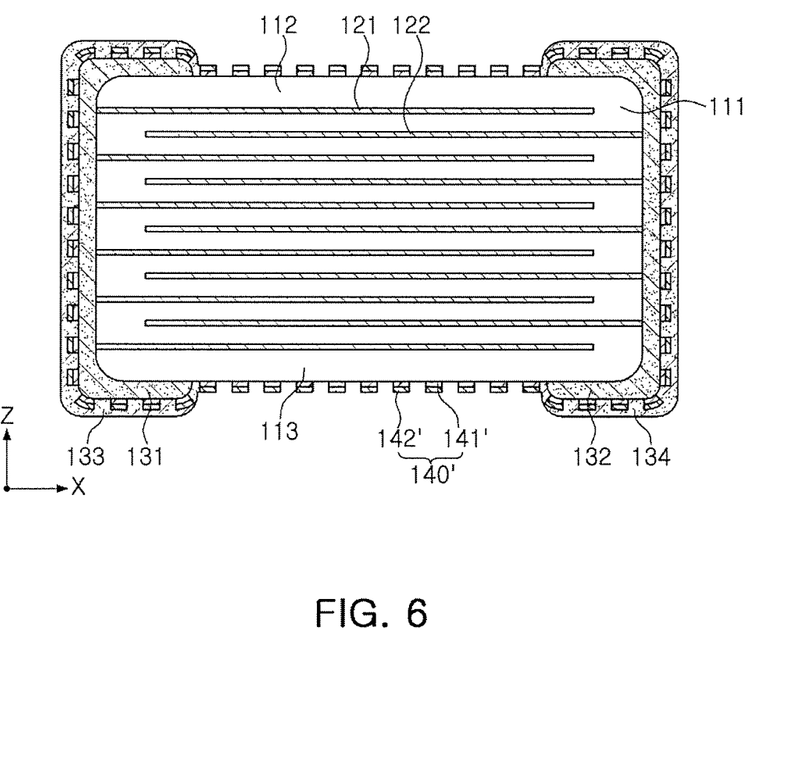
FIG. 6 is a cross-sectional view of a multilayer electronic component according to a second embodiment of the present disclosure.
Figure 7:
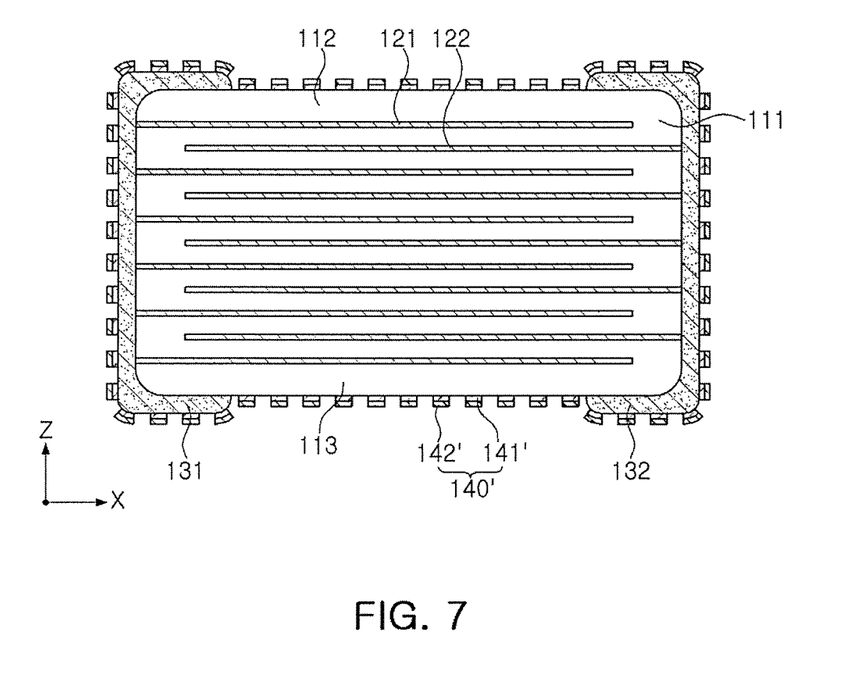
FIG. 7 is a cross-sectional view formed by removing a plating layer from FIG. 6.

FIG. 6 is a cross-sectional view of a multilayer electronic component according to a second embodiment of the present disclosure. FIG. 7 is a cross-sectional view formed by removing a plating layer from FIG. 6.

Here, structures of the first and second internal electrodes 121 and 122 and the capacitor body 110 are similar to the aforementioned embodiment and, thus, a detailed description thereof is omitted to avoid repetition.

Referring to FIGS. 6 and 7, an electronic component according to a second embodiment of the present disclosure may be configured in such a way that a coating layer 140' has island form.

According to the present embodiment, the coating layer 140' may include first and second coating layers 141' and 142' and may be partially formed on a surface of the first and second conductive layers 131 and 132 as well as on a portion of a surface of the capacitor body 110, which is not covered by the first and second plating layers 133 and 134.

That is, the coating layer 140' may be formed on a portion between the first conductive layer 131 and the first plating layer 133 and a portion between the second conductive layer 132 and the second plating layer 134.

Hereinafter, a method of forming a coating layer and a plating layer to manufacture a multilayer electronic component according to the present embodiment is described.

First, the first and second conductive layers 131 and 132 may be formed and sintered on opposite ends of the capacitor body 110 to prepare a sintered body.

Figure 4:
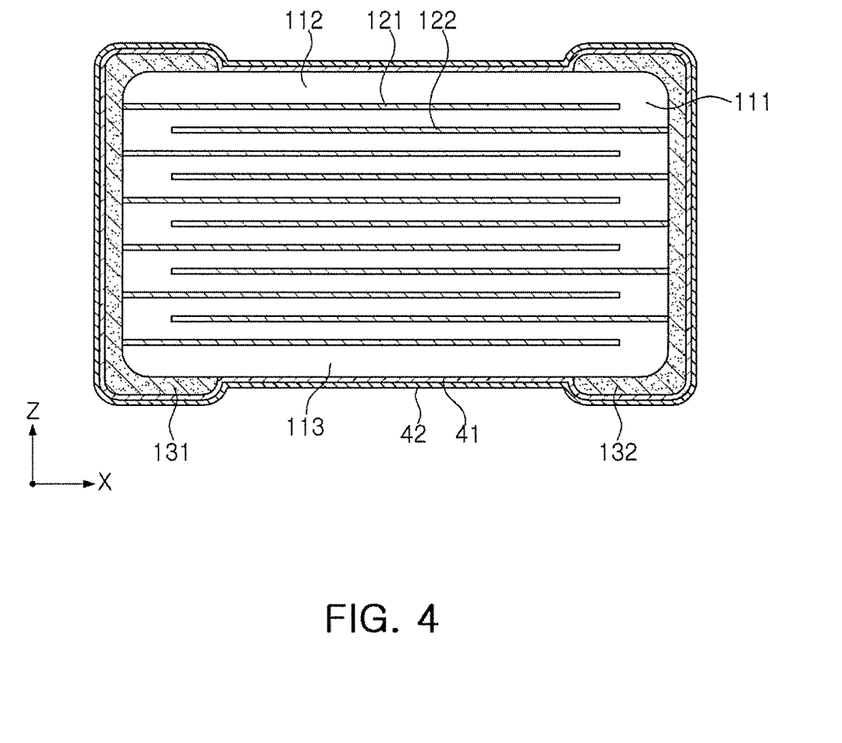
FIG. 4 is a cross-sectional view showing the case in which a coating layer is formed on surfaces of a capacitor body and a coating layer according to a first embodiment of the present disclosure.

Then, as shown in FIG. 4, thin films 41 and 42 may be coated and dried on a circumference of the sintered body using an atomic layer deposition (ALD) process two times or more to form a multilayer coating layer.

In this case, the ALD process may be used to coat a thin film up to a very small gap while thinly adjusting a thickness of a coating layer.

According to the present embodiment, the multilayer coating layer is configured with a double-layered structure of first and second coating layers 41 and 42 but the present disclosure is not limited thereto and, for example, the multilayer coating layer may be configured in a structure including three layers or more.

The first and second coating layers 41 and 42 may be formed of different thin film materials.

For example, the first coating layer 41 positioned at an internal side may be formed by coating a material including aluminum oxide ($Al_2O_3$) and the second coating layer 42 positioned at an external side may be formed by coating a material including silicon dioxide ($SiO_2$) or the first coating layer 41 positioned at an internal side may be formed by coating a material including aluminum oxide ($Al_2O_3$) and the second coating layer 42 positioned at an external side may be formed by coating a material including titanium dioxide ($TiO_2$).

Figure 5:
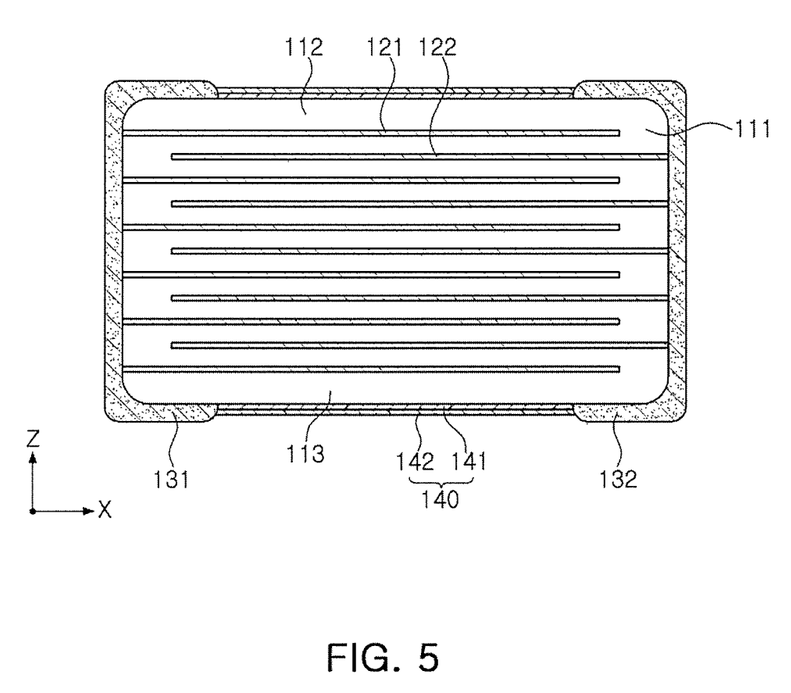
FIG. 5 is a cross-sectional view obtained by removing the coating layer formed on the surface of the conductive layer from FIG. 1.

Then, as shown in FIG. 5, a thin film formed on a surface of the first and second conductive layers 131 and 132 may be removed via SiC grinding or the like. Accordingly, the first and second coating layers 141 and 142 may be formed only on a portion of the capacitor body 110, which is not covered by the first and second conductive layers 131 and 132.

In this case, an entire thickness of a coating layer 140 including the first and second coating layers 141 and 142 may be 10 nm to 200 nm.

When the entire thickness of the coating layer 140 is less than 10 nm, an effect of enhancing damp proof reliability may be degraded and, when the entire thickness of the coating layer 140 is greater than 200 nm, unnecessary process time may be increased and plating failure may be increased.

Then, the first and second plating layers 133 and 134 may be formed on surfaces of the first and second conductive layers 131 and 132, respectively, using a plating process to prepare the multilayer electronic component, as shown in FIG. 2.

In this case, the first and second plating layers 133 and 134 may be formed by performing nickel plating on the first and second conductive layers 131 and 132 to form a nickel plating layer and performing tin plating on the nickel plating layer to form a tin plating layer.

According to the present embodiment, the coating layer 140 including the first and second coating layers 141 and 142 may be formed on a surface of the capacitor body 110, thereby enhancing damp proof reliability of the multilayer electronic component.

As shown in FIGS. 6 and 7, in the forming of the coating layer 140', the coating layer 140' may be formed by coating a thin film in island form.

In this case, even if the first and second coating layers 141' and 142' are formed between the first conductive layer 131 and the first plating layer 133 and between the second conductive layer 132 and the second plating layer 134 as well as a portion of the capacitor body 110, which is not covered by the first and second plating layers 133 and 134, electrical connection between the conductive layer and the plating layer is maintained and, thus, an operation of removing a coating layer formed on a surface of the conductive layer may be omitted or an operation of allowing a portion of the coating layer to be left on a surface of the first and second conductive layers 131 and 132 may be performed.

In a typical multilayer capacitor, a plating solution may penetrate trough a portion of an external electrode, the density of which is lowered, to damage an internal electrode and to cause failure of damp proof reliability during a plating process of a manufacturing method.

Further, when birdcaging between a capacitor body and an external electrode occurs during a process, the corresponding gap portion may act as a water penetrating path to degrade damp proof reliability.

Accordingly, to enhance damp proof reliability, a method of forming an organic layer on an end of an external electrode using an impregnation-coating method is disclosed and, in this case, a material such as polydimethylsiloxane (PDMS) may be used.

In such an impregnation method, when birdcaging occurs on a boundary surface between a capacitor body and an external electrode, some gaps may be filled, but when a gap is thin, it is difficult to allow a material to penetrate into the gap and, thus, there may be a problem of pores being accumulated in the external electrode.

To solve this, according to the present embodiment, after an external electrode is sintered, a multilayer thin film layer may be coated on an entire surface of a multilayer electronic component using a thin film atomic layer deposition (ALD) process.

When birdcaging occurs on a boundary surface between a capacitor body and an external electrode, even if a gap is thin, a material is capable of penetrating into a portion by a depth, which prevents pores from being accumulated in the external electrode, thereby enhancing damp proof reliability of the product.

The multilayer electronic component manufactured as such may be used in bypassing, interstage coupling, filter, or the like of an IT device.

As set forth above, according to an exemplary embodiment in the present disclosure, damp proof reliability of a multilayer electronic component may be enhanced.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
    a capacitor body including first and second surfaces facing each other, third and fourth surfaces connected to the first and second surfaces and facing each other, and fifth and sixth surfaces connected to the first and second surfaces, connected to the third and fourth surfaces, and facing each other, and including a plurality of dielectric layers, and first and second internal electrodes, alternately disposed across the dielectric layers to expose one end of the first and second internal electrodes through the third and fourth surfaces;
    a first conductive layer and a second conductive layer disposed on the third and fourth surfaces of the capacitor body and connected to the first and second internal electrodes, respectively;
    a first plating layer and a second plating layer covering surfaces of the first and second conductive layers; and
    a plurality of coating layers configured in a multilayer structure on a surface of the capacitor body to expose the first and second plating layers and having an entire thickness of 10 nm to 200 nm,
    wherein the plurality of coating layers is arranged and configured such that at least a portion of the surface of the capacitor body is exposed to an outside of the capacitor body through at least one gap between adjacent portions of the plurality of coating layers.

2. The multilayer electronic component of claim 1, wherein at least some of the plurality of coating layers are formed of different materials.

3. The multilayer electronic component of claim 2, wherein the plurality of coating layers are configured with a double-layered structure, and an internal coating layer of the plurality of coating layers includes aluminum oxide ($Al_2O_3$) and an external coating layer of the plurality of coating layers includes any one of silicon dioxide ($SiO_2$) or titanium dioxide ($TiO_2$).

4. The multilayer electronic component of claim 1, wherein the plurality of coating layers are further disposed on a portion between the first conductive layer and the first plating layer and a portion between the second conductive layer and the second plating layer.

5. The multilayer electronic component of claim 1, wherein the first and second plating layers include a nickel (Ni) plating layer disposed on the first and second conductive layers, and a tin (Sn) plating layer disposed on the nickel (Ni) plating layer.

6. A multilayer electronic component comprising:
    a capacitor body including first and second surfaces facing each other, third and fourth surfaces connected to the first and second surfaces and facing each other, and fifth and sixth surfaces connected to the first and second surfaces, connected to the third and fourth surfaces, and facing each other, and including a plurality of dielectric layers, and first and second internal electrodes, alternately disposed across the dielectric layers to expose one end of the first and second internal electrodes through the third and fourth surfaces;
    a first conductive layer and a second conductive layer disposed on the third and fourth surfaces of the capacitor body and connected to the first and second internal electrodes, respectively;
    a first plating layer and a second plating layer covering surfaces of the first and second conductive layers; and
    a plurality of coating layers configured in a multilayer structure on a surface of the capacitor body to expose the first and second plating layers,
    wherein at least some of the plurality of coating layers are formed of different materials, and
    wherein the plurality of coating layers is arranged and configured such that at least a portion of the surface of the capacitor body is exposed to an outside of the capacitor body through at least one gap between adjacent portions of the plurality of coating layers.

7. The multilayer electronic component of claim 6, wherein the plurality of coating layers have an entire thickness of 10 nm to 200 nm.

8. The multilayer electronic component of claim 6, wherein the plurality of coating layers are configured with a double-layered structure, and an internal coating layer of the plurality of coating layers includes aluminum oxide ($Al_2O_3$) and an external coating layer of the plurality of coating layers includes any one of silicon dioxide ($SiO_2$) or titanium dioxide ($TiO_2$).

9. The multilayer electronic component of claim 6, wherein the plurality of coating layers are further disposed on a portion between the first conductive layer and the first plating layer and a portion between the second conductive layer and the second plating layer.

10. The multilayer electronic component of claim 6, wherein the first and second plating layers include a nickel (Ni) plating layer disposed on the first and second conductive layers, and a tin (Sn) plating layer disposed on the nickel (Ni) plating layer.

\* \* \* \* \*